(12) United States Patent
Subacchi

(10) Patent No.: US 9,469,053 B2
(45) Date of Patent: Oct. 18, 2016

(54) COMPOSITE PALLET FOR CONCRETE PIPE

(71) Applicant: Hawkeye Concrete Products Co., Mediapolis, IA (US)

(72) Inventor: Claudio Subacchi, Mediapolis, IA (US)

(73) Assignee: Hawkeye Concrete Products Co., Mediapolis, IA (US)

(*) Notice: Subject to any disclaimer, the term of this patent is extended or adjusted under 35 U.S.C. 154(b) by 389 days.

(21) Appl. No.: 14/162,152

(22) Filed: Jan. 23, 2014

(65) Prior Publication Data

US 2015/0202801 A1  Jul. 23, 2015

(51) Int. Cl.
| B29C 33/40 | (2006.01) |
| B29C 39/14 | (2006.01) |
| B29C 39/00 | (2006.01) |
| B29C 39/26 | (2006.01) |
| B28B 21/76 | (2006.01) |
| B29L 31/00 | (2006.01) |

(52) U.S. Cl.
CPC ............ *B29C 33/40* (2013.01); *B28B 21/765* (2013.01); *B29C 39/006* (2013.01); *B29C 39/146* (2013.01); *B29C 39/26* (2013.01); *B29K 2827/18* (2013.01); *B29K 2907/04* (2013.01); *B29L 2031/757* (2013.01)

(58) Field of Classification Search
CPC ...... B28B 21/765; B29C 33/40; B29C 39/26
See application file for complete search history.

(56) References Cited

U.S. PATENT DOCUMENTS

| 1,941,812 | A | 1/1934 | Muntz |
| 3,078,539 | A | 2/1963 | Duplesis |
| 3,201,843 | A | 8/1965 | Osweiler |
| 3,584,356 | A | 6/1971 | Joelson |
| 3,773,447 | A | 11/1973 | Barratt |
| 3,941,347 | A | 3/1976 | Robertson et al. |
| 4,047,693 | A | 9/1977 | Holme |
| 4,305,564 | A * | 12/1981 | Jensen .................. B28B 7/0011 249/100 |
| 5,259,586 | A | 11/1993 | Miller, Sr. |
| 6,004,126 | A | 12/1999 | Strobel |
| 2013/0291766 | A1 | 11/2013 | Subacchi |

FOREIGN PATENT DOCUMENTS

| DE | 1759687 | 7/1971 |
| DE | 3721077 | 1/1989 |
| DE | 102009016804 | 10/2010 |
| EP | 0686245 | 6/2000 |
| SU | 650820 | 3/1979 |

OTHER PUBLICATIONS

International Search Report and Written Opinion of the International Searching Authority dated Oct. 9, 2014 from counterpart PCT patent application No. US2014/012728.
International Search Report and Written Opinion of the International Searching Authority dated Jul. 9, 2013 from related PCT patent application.
Subacchi—U.S. Appl. No. 13/875,136, filed May 2, 2013.

* cited by examiner

*Primary Examiner* — James Sanders
(74) *Attorney, Agent, or Firm* — Shuttleworth & Ingersoll, PLC; Jason Sytsma

(57) ABSTRACT

A pallet includes a rigid body that supports a concrete product and a polymer layer that corresponds to a geometry of the concrete product within a predetermined tolerance. One or more flanges with apertures are provided with the rigid body for the polymer layer to attach thereto. The polymer layer can extend outward from the rigid body to form a portion of the dimensions for the concrete product within predefined tolerances.

3 Claims, 7 Drawing Sheets

COMPOSITE PALLET FOR CONCRETE PIPE

BACKGROUND

The inventions disclosed herein relate generally to form structures used for manufacturing concrete products. More specifically the invention relates to composite forms and the method of manufacturing the composite forms, which are used for forming the end of a concrete product and supporting and transporting the concrete products, such as culverts, pipes, and the like during the manufacture and curing processes.

Concrete pipes are manufactured by casting a concrete mixture or slurry in a mold. The mold is mounted coaxially on a pallet/mold or base for curing. Traditionally, these pallets for concrete pipes are made from cast iron, cast steel, fabricated steel, or pressed steel. A steel base, however, is expensive because of the high cost of steel and the high cost of working it. In relatively large plants for making concrete pipe, the steel bases alone require a substantial capital investment.

SUMMARY

A method is provided for making a pallet for a concrete product. The method begins by providing a mold having an outer shell with a first face and a second face positioned beneath the first face. A first sealing strip is attached to the first face and a second sealing strip is attached to the second face. A rigid body is placed into the mold, then a liquid polymer is injected into the mold filling an area between the first sealing strip and the second sealing strip. The liquid polymer is then allowed to cure.

The rigid body is removed from the mold, and then, the first sealing strip and the second sealing strip are removed from the mold. The rigid body is then placed back into the mold. Liquid polymer is injected into the mold filling an area between the outer shell and where the first sealing strip was located. Liquid polymer is also injected in the area between the outer shell and where the second sealing strip was located.

A pallet for a concrete product is also provided that is made in accordance with the herein described methods. The rigid body supports the concrete product. The polymer layer corresponds to a geometry of the concrete product within a predetermined tolerance. In this manner, a pallet can be quickly made with tolerances commensurate with a machine-finished pallet, at a fraction of the cost.

The pallet includes a first flange that extends horizontally outward with respect to a center of the rigid body and includes at least one aperture for the polymer layer to extend through to attach the polymer layer to the first flange. The polymer layer includes a first portion that extends outward from the first flange. The pallet further includes a second flange that extends horizontally inward with respect to a center of the rigid body and includes at least one aperture for the polymer layer to extend through to attach the polymer layer to the second flange. The polymer layer includes a second portion that extends outward from the second flange toward the center of the rigid body.

The invention will appear more clearly from the following detailed description when taken in connection with the accompanying drawings, showing by way of example an illustrated embodiment wherein like numerals refer to like parts throughout.

DESCRIPTION OF THE ILLUSTRATED EMBODIMENTS

Figure 1:
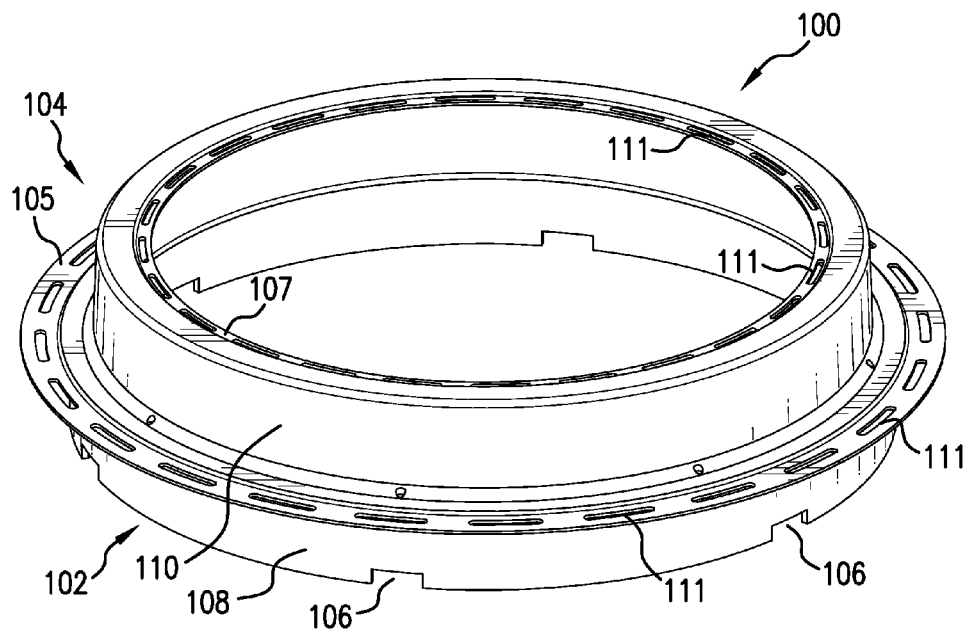
FIG. 1 is a perspective view of a rigid body.
Figure 1A:
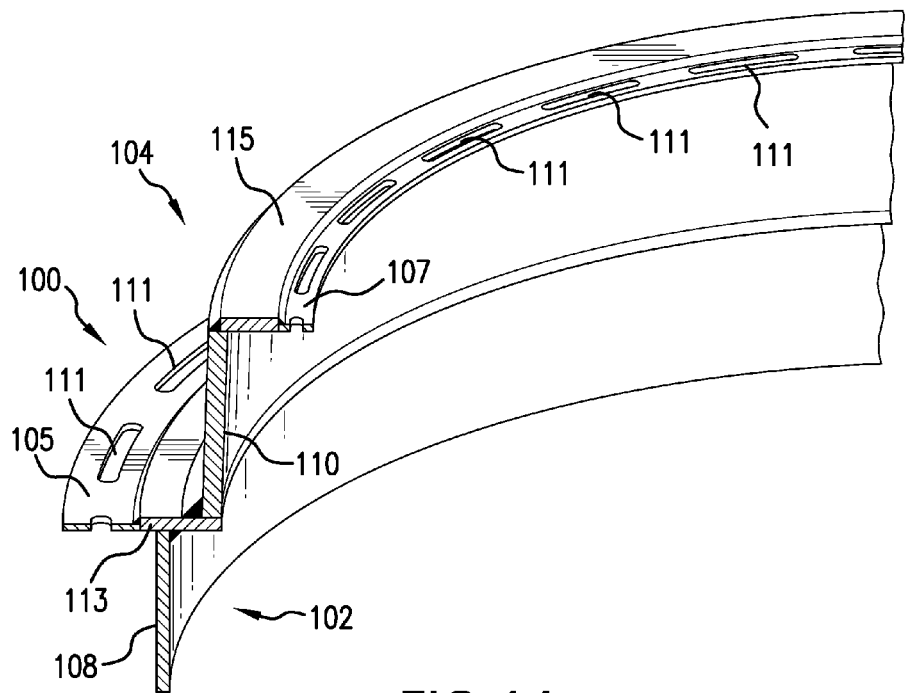
FIG. 1A is a perspective sectional view of the rigid body of FIG. 1.
Figure 6:
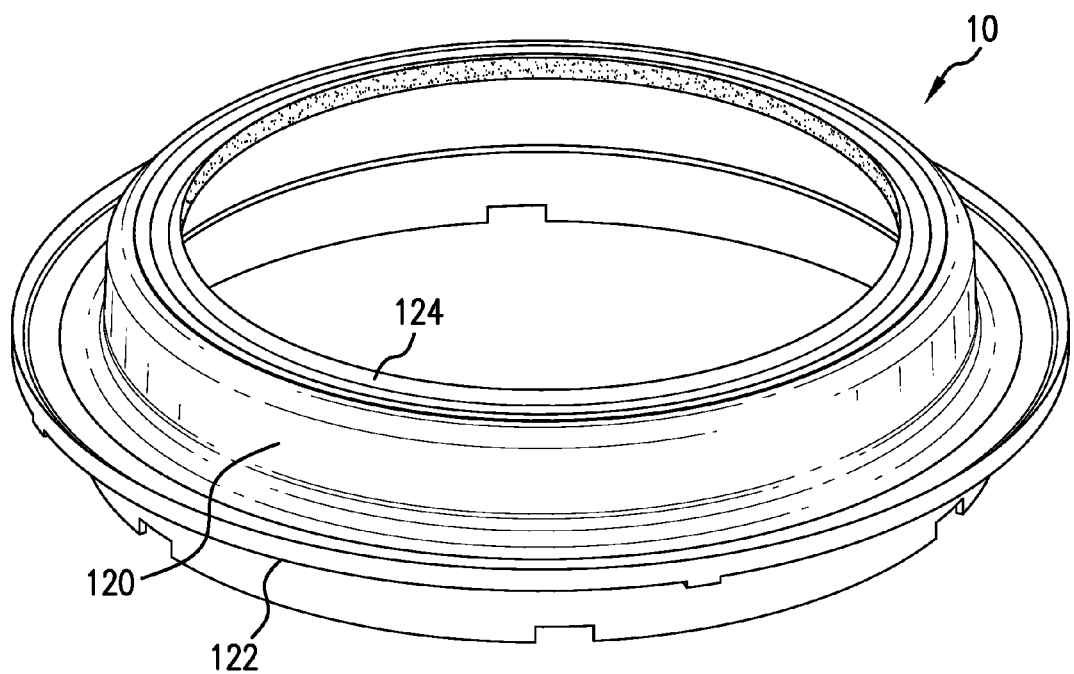
FIG. 6 is a perspective of the rigid body with a first and a second polymer layer molded on the rigid body.
Figure 6A:
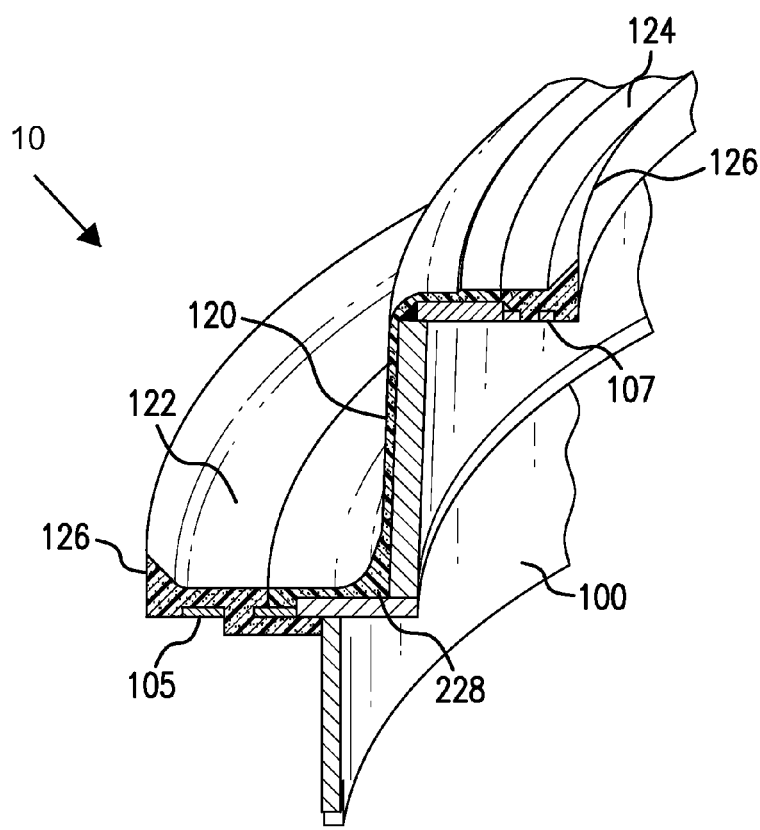
FIG. 6A is a perspective view of the rigid body of FIG. 6.

FIGS. 1 and 1A show a rigid body 100 forming an inner core of a composite pallet 10 (shown in FIGS. 6 and 6A). For the purpose of this disclosure it is understood that a "pallet" in this context is useful for transporting a concrete product, as well as a mold for forming the end of a concrete product, such as a culvert, and supporting the product while it is curing. In this regard, the composite pallet 10 must have a substantially smooth surface and finish within a precise tolerance. This way the concrete pipe can be formed on pallet 10 and the tight tolerances and smooth finish of pallet 10 will allow the concrete pipe to cure and form without deformation.

Rigid body 100 includes, generally, a bottom section 102 comprised of first annular ring 108 and a top section 104 with a z-shaped profile. Top section 104 includes a second annular ring 110 that is generally vertical combined to two generally horizontal first load bearing surface 113 and second load bearing surface 115. First load bearing surface 113 and second load bearing surface 115 of rigid body 100 will support the load of the concrete product during the curing process. First load bearing surface 113 has a first flange 105 extending outwardly from a second annular ring 110 away from a center of rigid body 100. Second load bearing surface 115 has a second flange 107 extending outwardly from second annular ring 110 toward the center of rigid body 100.

First flange 105 and second flange 107 each have a plurality of apertures spaced apart around each first flange 105 and second flange 107. These apertures are ovular shaped and are used to provide a space for the polymer coating to surround and attach the polymer coating to rigid body 100.

First annular ring 108 of bottom section 102 has a plurality of notches 106 spaced apart around the circumference of the bottom edge of annular ring 108 to provide access for the forks on a fork lift that is used to transport composite pallet after the concrete product is formed and while it is curing.

Bottom section 102 and top section 104 are each formed from a suitable material, such as steel, and are combined together by welding, for example, to provide a unitary structure. First annular ring 108 of bottom section 102 functions to support and position the completed composite pallet during the manufacturing process.

Figure 2:
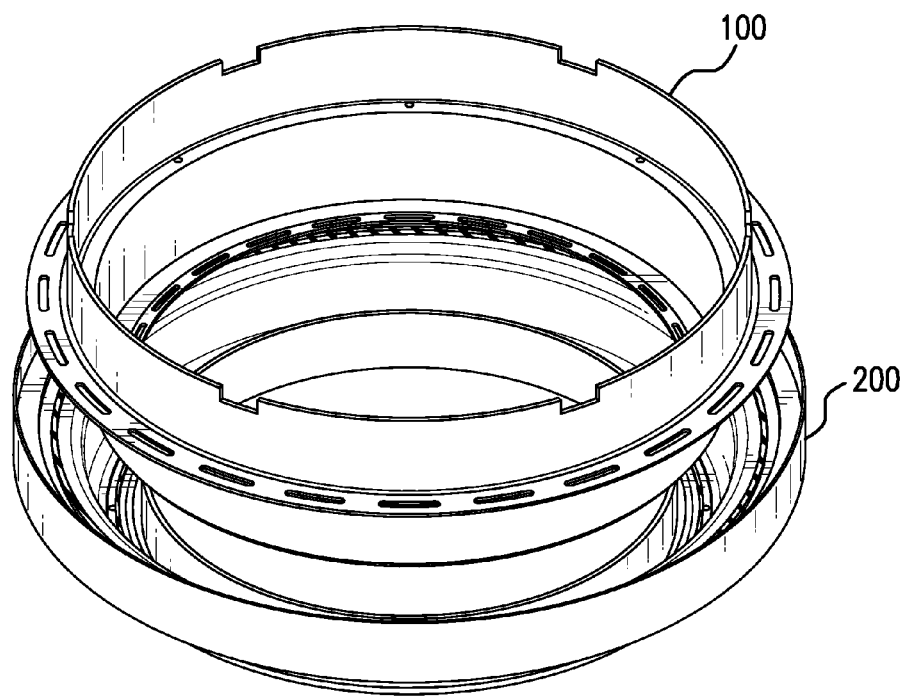
FIG. 2 is a perspective view of a form receiving the rigid body of FIG. 1.
Figure 2A:
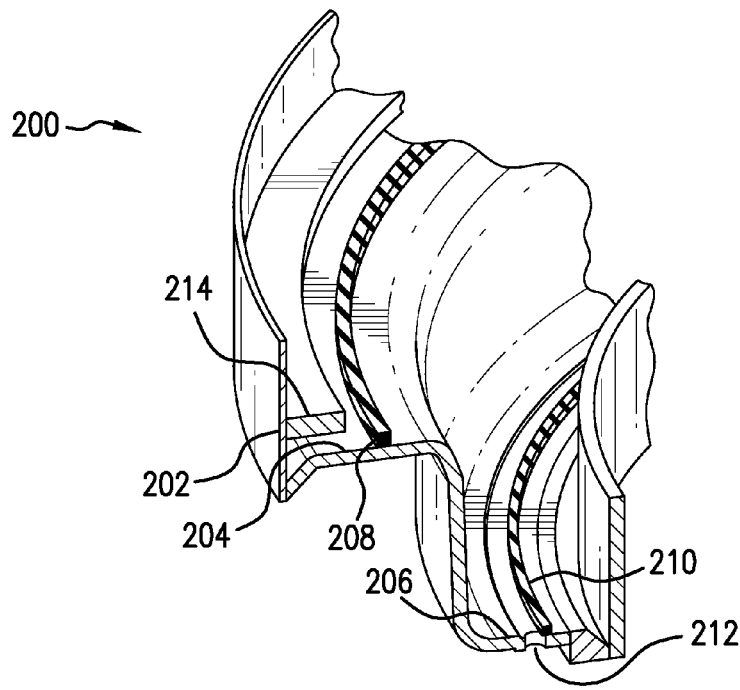
FIG. 2A is a perspective view of the form of FIG. 2.

Rigid body 100 is inserted into a mold or casting 200 to be suitably coated. FIGS. 2 and 2A show mold 200. Mold 200 can be bisected in half so that it comes apart and can be reattached with latches or fasteners to form around rigid body 100. Mold 200 includes an outer shell 202 with a z-shaped profile having a first face 204 and a second face 206. Outer shell 202 generally conforms to the shape of rigid body 100 in the inverted position. First face 204 and second face 206 have a first sealing strip 208 and a second sealing strip 210, respectively. First sealing strip 208 and second sealing strip 210 are removable and replaceable, which benefits will be further explained with the explanation of the manufacturing process.

Outer shell 202 has one or more inlets 212 spaced around to provide ports to inject liquid polymer and evacuate air. One or more sealing edges 214 are positioned around mold 200 to seal the inside of mold 200 when rigid body 100 is placed inside. This way, a vacuum can be formed inside the space between outer shell 202 and rigid body 100 for injecting the liquid polymer.

Figure 3:
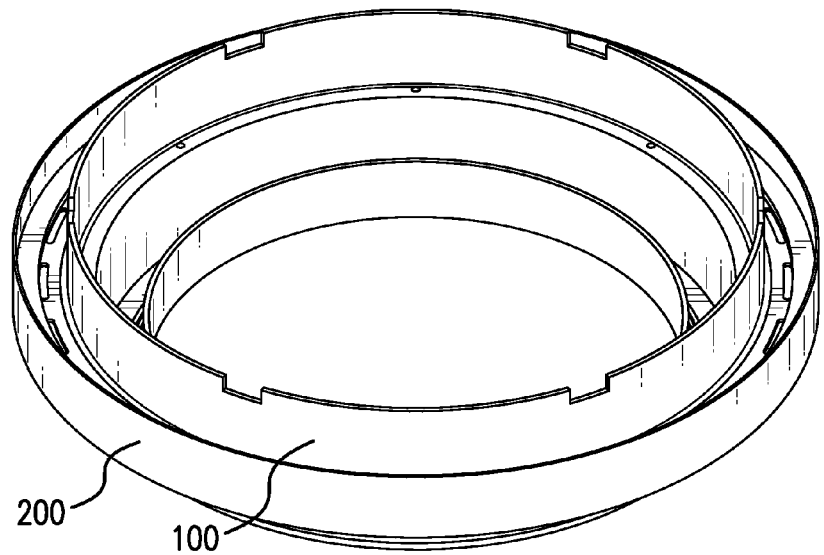
FIG. 3 is a perspective view of the rigid body of FIG. 1 received in the form of FIG. 2.
Figure 3A:
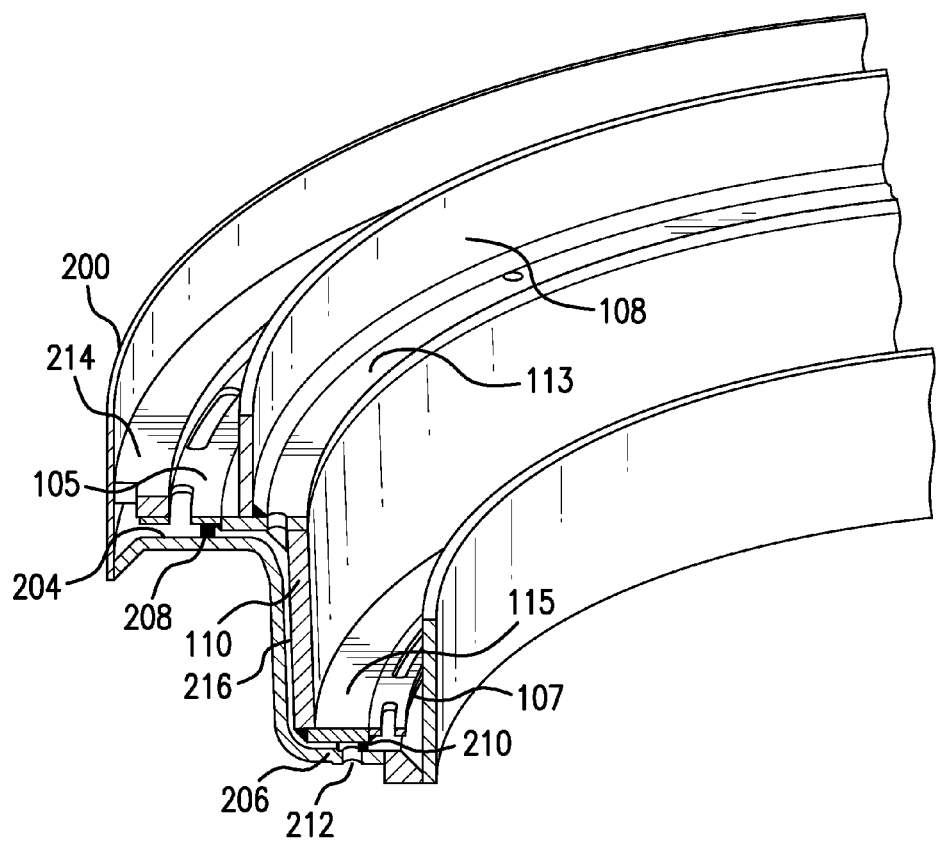
FIG. 3A is a perspective sectional view of the rigid body of FIG. 1 received in the form of FIG. 2, as shown in FIG. 3.

The first step in the process for manufacturing a composite pallet is to place rigid body 100 upside down in mold 200, as shown in FIGS. 3 and 3A. As shown in FIG. 3A, first load bearing surface 113 is pressed against first sealing strip 208 and second load bearing surface 115 is pressed against second sealing strip 210. A void 216 is formed between rigid body 100 and mold 200 in the area between first sealing strip 208 and second sealing strip 210 with inlet(s) 212 between first sealing strip 208 and second sealing strip 210. An injecting nozzle is attached to inlet 212 and the air is evacuated out and a liquid polymer is injected in. Void 216 is filled with liquid polymer and allowed to cure.

Figure 4:
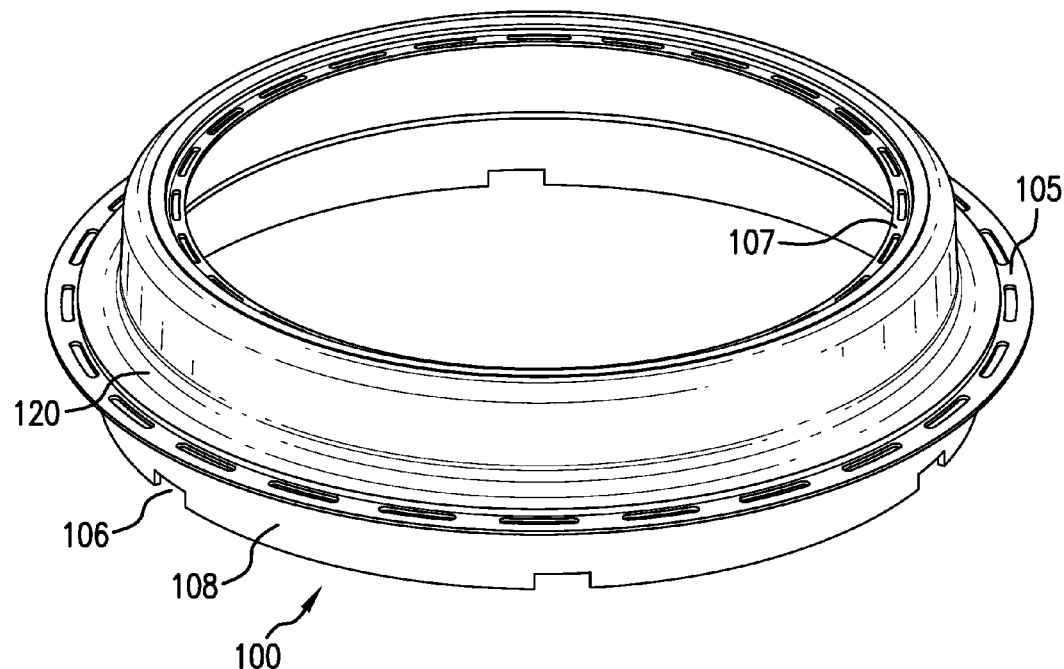
FIG. 4 is a perspective view of the rigid body with a first polymer layer molded on the rigid body.
Figure 4A:
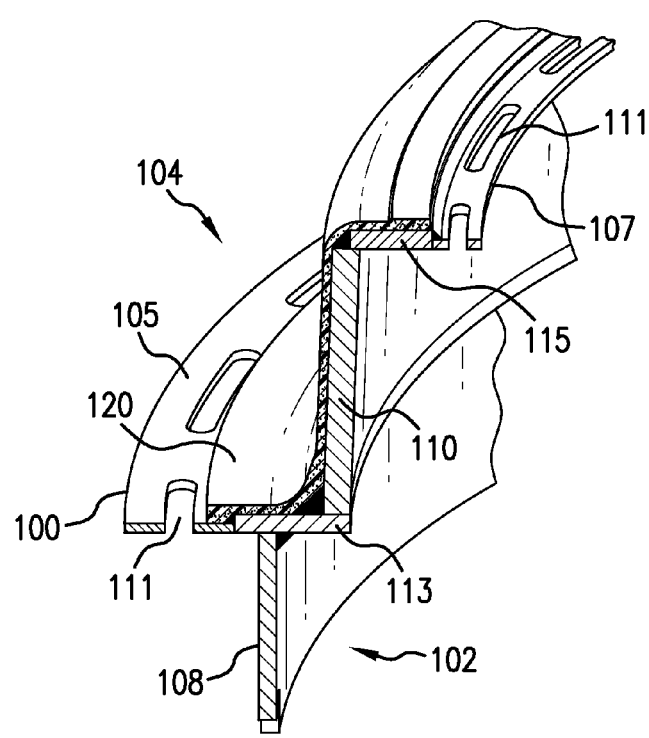
FIG. 4A is a perspective view of the rigid body of FIG. 4.

Once the liquid polymer has cured, rigid body 100 can be removed from mold 200, as shown in FIGS. 4 and 4A. Rigid body 100 now has a first polymer layer 120 formed on first load bearing surface 113 and extending up second annular ring 110 and onto second load bearing surface 115. First polymer layer 120 is molded to rigid body 100 and formed dimensionally to the desired size of the concrete product with substantially smooth surfaces and the tight tolerances to allow the concrete pipe to cure and form without deformation.

Figure 5:
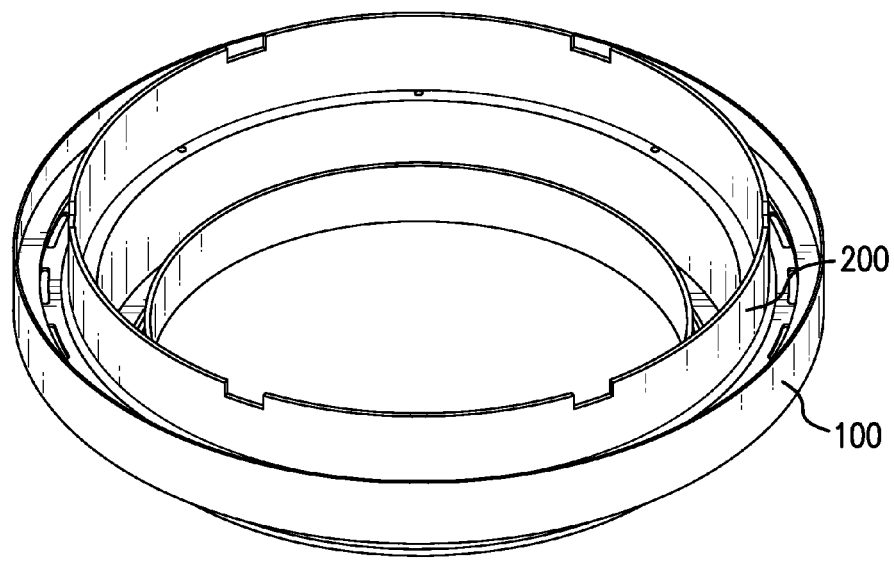
FIG. 5 is a perspective view of the rigid body of FIG. 4 received in the form of FIG. 2 with the sealing strips removed.
Figure 5A:
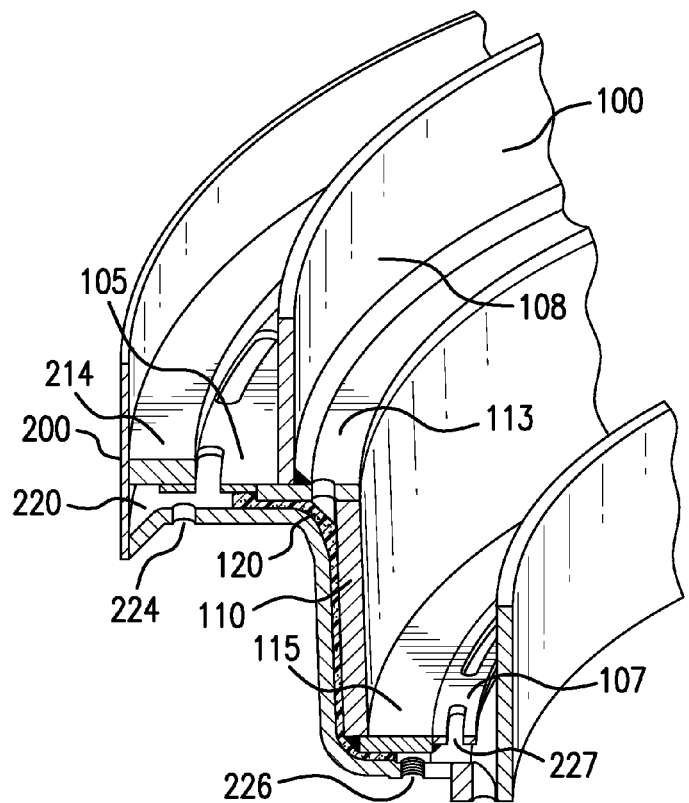
FIG. 5A is a perspective sectional view of the rigid body of FIG. 4 received in the form of FIG. 2 with the sealing strips removed, as shown in FIG. 5.

Rigid body 100 can be inserted back upside down in mold 200 with first sealing strip 208 and second sealing strip 210 removed, as shown in FIGS. 5 and 5A. One or more sealing edges 214 attached to mold 200 or cover can be added to hermetically seal the area above first flange 105 and second flange 107 to provide a void 220 and a void 222 around first flange 105 and second flange 107, respectively, for a second polymer layer 122 and a third polymer 124. An injecting nozzle is attached to inlets 224 and/or 226, and the air is evacuated out and a liquid polymer is injected in. Voids 220 and 222 can be filled with liquid polymer and allowed to cure.

Once the liquid polymer has cured, rigid body 100 can be removed from mold 200, as shown in FIGS. 6 and 6A. Rigid body 100 now has a first polymer layer 120 formed on first load bearing surface 113 and extending up second annular ring 110 and onto second load bearing surface 115, and a second polymer layer 122 formed around first flange 105 and a third polymer layer 124 formed around second flange 107. Rigid body 100 with polymer layers 120, 122, and 124 can now be used as a concrete mold. These polymer layers 120, 122, and 124 are molded to rigid body 100 and formed dimensionally to the desired size of the concrete product with substantially smooth surfaces and the tight tolerances to allow the concrete pipe to cure and form without deformation.

Second polymer layer 122 and third polymer layer 124 can be formed with a portion, including bevels 126 or other features to provide the desired dimension of the final concrete product. In this regard, a molded polymer layer can be formed to the desired dimensions of the final mold. Unlike a polymer coating, which is merely applied and coated over the shape of the underlying structure. This benefits and features of molded polymer layer 120, 122, and 124 are apparent when examining FIGS. 6 and 6A, which shows a completed composite pallet 10. Bevels 126 are part of a portion that extends outward from first flange 105 and 107 unsupported by an underlying structure. A radius 228 can be formed at the junction above first load bearing surface 113 and second annular ring 110. Radius 228 is built up with a thickness greater than the thickness of first polymer layer 120 on second annular ring 110. This can only be done by a molding process.

In alternative embodiments, polymer layers 120, 122, and 124 can be combined and formed in a single pouring process or separated into multiple pouring processes. A low-friction polymer can be used so the concrete products can be easily removed from the concrete pallet. Examples of low-friction polymers include polymers with Teflon, PTFE, or graphite as a release agent. Additional releasing agents can be coated on the surface after the polymer has cured and before pallet 100 and 200 are used.

In yet another embodiment, polymer layers 120, 122, and 124 can be vacuum formed to rigid body 100. In this embodiment, rigid body 100 is placed in an enclosure, and polymer layers 120, 122, and 124 are adhered to rigid body 100 by vacuum forming. In yet another embodiment, the polymer layer is placed in a cast and a rigid body made form concrete is formed and casted to the polymer layers.

Figure 7:
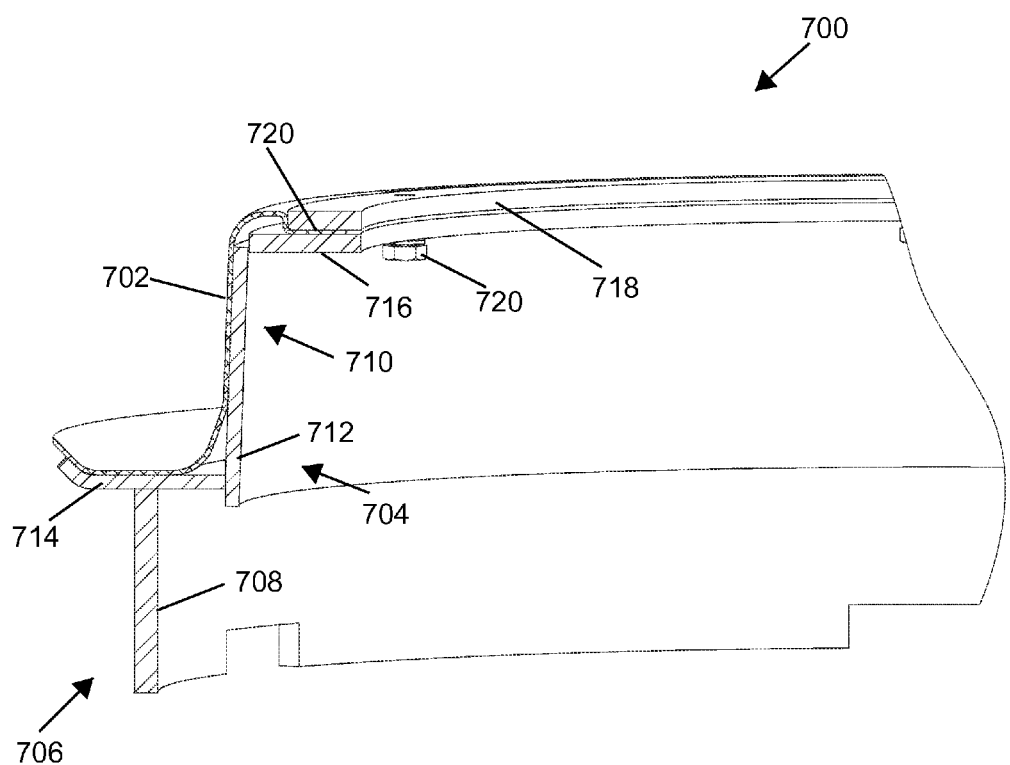
FIG. 7 is an alternative embodiment of a polymer layer molded separately from the rigid structure and attached to the rigid structure.

FIG. 7 shows an alternative embodiment of a composite pallet 700 where a polymer layer 702 is molded separately from a rigid body 704 and attached to rigid body 702 after it has cured. Rigid body 704 includes, generally, a bottom section 706 comprised of first annular ring 708 and a top section 710 with a z-shaped profile. Top section 710 includes a second annular ring 712 that is generally vertical combined to two generally horizontal first load bearing surface 714 and second load bearing surface 716. First load bearing surface 714 and second load bearing surface 716 of rigid body 704 will support the load of the concrete product during the curing process.

Polymer layer 702 is created in a mold, and after it has cured, polymer layer 702 is attached to rigid body 104. Polymer layer 702 is attached by placing a ring 718 on top of a flange portion 720 of polymer layer 702 and connected to second load bearing surface 716 by one or more fasteners 720. Other attachment mechanisms are also contemplated within this disclosure.

The foregoing embodiments advantageously provide a composite pallet having a substantially smooth surface and finish within a precise tolerance without the need to machine the surface. This way the concrete pipe can be formed on the composite pallet and the tight tolerances and smooth finish of the composite pallet will allow the concrete pipe to cure and form without deformation. Polymer layers herein described can have a thickness of 1-5 mm or 1/16 to 1/4 inches, or any range therebetween. This is different than painting a polymer coating onto the rigid body. The difference being that a molded polymer layer forms part of the dimensions of the composite pallet, and in this regard, the polymer layers are formed to the required geometry within the tight tolerances required for molding a finished concrete product. Painting a polymer coating to a rigid body does not have the same effect since in this manner the rigid body must be formed to the required geometry and with the tight tolerances, and the coating is merely a thin layer that does not form any of the structure of the complete product.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents.

What is claimed is:

1. A method for making a pallet for a concrete product, the method comprising:
   providing a mold having an outer shell with a first face and a second face positioned beneath the first face and a first sealing strip attached to the first face and a second sealing strip attached to the second face;
   placing a rigid body into the mold;
   injecting liquid polymer into the mold and filling an area between the first sealing strip and the second sealing strip; and
   curing the liquid polymer;
   removing the first sealing strip and the second sealing strip from the mold; and
   placing the rigid body into the mold and injecting liquid polymer into the mold and filling an area between the outer shell and where the first sealing strip was located with the liquid polymer.

2. The method of claim 1, and further comprising injecting liquid polymer into the mold and filling an area between the outer shell and where the second sealing strip was located with the liquid polymer.

3. The method of claim 2, wherein the liquid polymer comprises a low-friction element comprising one chosen from a group of Teflon, PTFE, and graphite.

* * * * *